US005625794A

United States Patent [19]
Inoue et al.

[11] Patent Number: 5,625,794
[45] Date of Patent: Apr. 29, 1997

[54] CACHE MODE SELECTION METHOD FOR DYNAMICALLY SELECTING A CACHE MODE

[75] Inventors: Taro Inoue, Sagamihara; Hidenori Umeno, Tsukui-gun; Sadasaburo Kanai, Kawasaki; Kazuo Imai, Higashikurume; Yoshiaki Shinmura, Chigasaki, all of Japan

[73] Assignee: Hitachi, Ltd., Tokyo, Japan

[21] Appl. No.: 21,664

[22] Filed: Feb. 24, 1993

[30]     Foreign Application Priority Data

Feb. 24, 1992  [JP]  Japan .................................. 4-035987

[51] Int. Cl.[6] .................................................. G06F 13/16
[52] U.S. Cl. ........................... 395/465; 395/466; 395/440
[58] Field of Search ................................ 395/440, 465, 395/466

[56]             References Cited

U.S. PATENT DOCUMENTS

| | | | |
|---|---|---|---|
| 4,500,954 | 2/1985 | Duke et al. | 395/465 |
| 4,956,803 | 9/1990 | Taylor et al. | 395/465 |
| 5,131,087 | 7/1992 | Warr | 395/440 |

FOREIGN PATENT DOCUMENTS 4-113414  4/1992  Japan .

OTHER PUBLICATIONS

CMG '90 Proceedings, "Dynamic Cache Management Can I/O Tuning be Automated", J.G. Aschoff, International Conference for the Management & Performance Evaluation of Computer Systems, Orlando, Florida, Dec. 10–14, 1990.
HITAC, H–8538–C1 and H–8598 (Translation) Translated Sections 3.5.

*Primary Examiner*—Eddie P. Chan
*Assistant Examiner*—Reginald G. Bragdon
*Attorney, Agent, or Firm*—Antonelli, Terry, Stout & Kraus, LLP

[57]             ABSTRACT

A cache mode selection method and system sets to a cache load inhibit mode a cache mode used for a random access dataset of lower access hit ratio if use ratio of a data transmission path exceeds beyond an upper use ratio limit. It also sets to the cache load inhibit mode the cache mode used by parts of a sequential access dataset. These make it possible to select a proper cache mode depending on state of a load dynamically to prevent an I/O response from decreasing so that the hit ratio can be increased.

1 Claim, 5 Drawing Sheets

VOLUME CACHE ACTIVITY INFORMATION 1300

| | |
|---|---|
| NUMBER OF TRACKS LOADED TO CACHE | ~1310 |
| OTHER INFORMATION | ~1320 |

FIG. 3

CYLINDER CACHE ACTIVITY INFORMATION 1400

| | |
|---|---|
| NUMBER OF READ TIMES OF BASIC MODE | ~1410 |
| NUMBER OF READ HITS OF BASIC MODE | ~1420 |
| NUMBER OF WRITE TIMES OF BASIC MODE | ~1430 |
| NUMBER OF WRITE HITS OF BASIC MODE | ~1440 |
| OTHER INFORMATION | ~1450 |

FIG. 4

CACHE USAGE ATTRIBUTE INFORMATION FOR DATASET 2400

| DATASET NAME | CACHE USE ATTRIBUTE |
|---|---|
| DEF | USE |
| GHI | AUTO |
| | |
| | |
| | |
| | |
| | |

DATASET EXTENT INFORMATION 2500

| DATASET NAME | DEVICE ADDRESS | START CYLINDER NUMBER | START TRACK NUMBER | END CYLINDER NUMBER | END TRACK NUMBER |
|---|---|---|---|---|---|
| ABC | 498 | 10 | 0 | 25 | 14 |
| | | | | | |
| | | | | | |
| | | | | | |
| | | | | | |
| | | | | | |
| | | | | | |
| | | | | | |

DKC MANAGEMENT TABLE 2600

| | |
|---|---|
| UPPER LIMIT OF USE RATIO | ~2605 |
| LOAD STATUS FLAG OF DATA TRANSMISSION PATH | ~2610 |
| CONTINUOUS TIME LENGTH COUNTER FOR THE EXCEEDED USE RATIO LIMIT (COUNTER A) | ~2620 |
| OPEN TIMES COUNTER (COUNTER B) | ~2630 |
| OTHER INFORMATION | ~2640 |

FIG. 7

CACHE MODE SELECTION METHOD FOR DYNAMICALLY SELECTING A CACHE MODE

BACKGROUND OF THE INVENTION

FIELD OF THE INVENTION

The present invention relates to a cache mode selection method and system. More particularly, it concerns a cache mode selection method and system for dynamic selection of a cache mode.

A cached disk controller (DKC) has several cache modes, such as a basic mode, sequential access mode, and a cache load inhibit mode.

The basic mode loads into a cache mode all data of tracks including accessed dataset. If a subsequent access is made to the dataset on the same track, the dataset exists on the cache memory, or the access hits the dataset. Thus, the access should be made to the cache memory. The access is made at higher speed than to a disk storage. If access is made to another dataset which does not exist on the cache memory, the access misses the dataset. All the data of the tracks including the other dataset have to be loaded in the cache memory before the access should be made to the dataset. Response is increased as a hit ratio (the number of hits relative to the number of misses) is high. In general, the data on the cache memory is managed according to a least recently used (LRU) rule. The LRU rule is a rule defined to make the data referred to most recently remain in the cache memory. According to the LRU rule, the data can be retained a long time in cache memory if it is referred to frequently. The data which has not been referred to for a long time is put out of the cache memory when new data is loaded.

The sequential access mode loads all data of the tracks including accessed dataset data and of a few succeeding tracks. That is, the sequential access mode reads a plurality of tracks in advance. This mode has a higher hit ratio for a sequential access file. It is used to read the sequential access file. In general, the data in the cache memory is managed according to the LRU rule.

The cache load inhibit mode is the same as the basic mode except that it directly accesses the disk storage, but does not load data including the dataset of concern to the cache memory in the event of a cache-miss. This means that it does not put any data out of the cache memory.

In general, the cache modes explained above should be selected depending on an attribute of the dataset. As examples, for a random access dataset, the basic mode should be selected; for sequential access dataset, the sequential access mode should be selected.

On the other hand, a dynamic cache mode selection method was disclosed in an article entitled "Dynamic Cache Management: Can I/O Tuning Be Automated?" in the CMG '90 Proceedings, pp 932–938, by John G. Aschoff. This method monitors a total hit ratio of a cache memory and if the total hit ratio is lower than a predetermined lower total hit ratio limit, a cache mode is switched to a cache load inhibit mode. If the total hit ratio is too low, the response is made rather lower because of overhead of loading to the cache memory. This is avoided by switching the cache mode to the cache load inhibit mode Of the conventional techniques described above, the selection method of the cache mode depending on the attribute of dataset cannot switch the cache mode dynamically. The method has the disadvantage that if the hit ratio is too low, the response is made rather lower because of overhead of loading to the cache memory.

As for the method that if the total hit ratio is lower than the predetermined lower total hit ratio limit, the cache mode is switched to the cache load inhibit mode, it monitors the total hit ratio only, ignoring the fact that the hit ratio differs with each dataset. Thus, the method has the disadvantage that even the dataset having a high hit ratio is put to the cache load inhibit mode, and the total performance is lowered unnecessarily.

On the other hand, as a use ratio of a data transmission path connected between the cache memory and the disk storage becomes high, the latency time is long. This lowers the I/O response.

If the use ratio of a data transmission path is too high, therefore, it is desirable that the cache mode should be set to the cache load inhibit mode after all.

SUMMARY OF THE INVENTION

In view of the foregoing, it is a first object of the present invention to provide a cache mode selection method and system that monitors a hit ratio for every dataset to select a proper cache mode.

A second object of the present invention is to provide a cache mode selection method and system that selects a proper cache mode in view of a use ratio of a data transmission path.

Briefly, the foregoing objects are accomplished in accordance with aspects of the present invention by the cache mode selection method and system. This obtains a cache access hit ratio for every dataset and if a cache access hit ratio of a dataset is lower than a predetermined lower hit ratio limit, a cache mode to be used by the dataset is set to a cache load inhibit mode to inhibit cache.

Also, the cache mode selection method and system of the present invention obtains a use ratio for every data transmission path between a cache memory and a secondary storage and if a use ratio of a data transmission path is higher than a predetermined upper use ratio limit, sets a cache mode for a dataset using the data transmission path to a cache load inhibit mode at a predetermined inhibit ratio.

The present invention can be seen in view of detailed aspects as follows. A first aspect of the present invention provides a cache mode selection method and system which obtains a cache read hit ratio for every dataset and if a cache read hit ratio of a dataset is lower than a predetermined lower hit ratio limit, the method and system sets a cache mode used by the dataset to a cache load inhibit mode.

A second aspect of the present invention provides a cache mode selection method and system which obtains a use ratio for every data transmission path between a cache memory and a secondary storage, obtains a cache read hit ratio for every dataset, and if a use ratio of a data transmission path to transmit a dataset is higher than a predetermined upper use ratio limit and if a cache read hit ratio of the dataset is lower than a predetermined lower use ratio limit, the method and system sets a cache mode for the dataset to use to a cache load inhibit mode.

A third aspect of the present invention provides a cache mode selection method and system which obtains a use ratio for every data transmission path between a cache memory and a secondary storage and if a use ratio of a data transmission path is higher than a predetermined upper use ratio limit, the method and system sets a cache mode for a dataset using the data transmission path to a cache load inhibit mode at a predetermined inhibit ratio.

A fourth aspect of the present invention provides a cache mode selection method and system in which a judgement is made as to whether a dataset is a random access dataset or a sequential access dataset, and if the dataset is a random access dataset, the method and system selects the cache mode selection method according to the above-mentioned second aspect, and by the dataset is a sequential access dataset, the method and system selects the cache mode selection method according to the above-mentioned third aspect.

The, manner of operation, novel features, and advantages of the present invention are as follows.

As for the cache mode selection method of the present invention in view of the first aspect, the cache mode selection method monitors the hit ratio for every dataset and sets the cache mode to load inhibit mode when the hit ratio is lower than the predetermined lower hit ratio limit.

As a result, the data of the dataset with low hit ratio cannot newly loaded into the cache memory. This lowers the use ratio of the data transmission path between the cache memory and the secondary storage, so that the I/O response of the system can be improved. The data of the dataset of high hit ratio, on the other hand, can consecutively use the cache. This maintains high efficiency of performance.

As for the cache mode selection method of the present invention in view of the second aspect, in addition to the cache mode selection method of the present invention in view of the first aspect, the cache mode selection method can consecutively use the cache if the use ratio of the data transmission path is lower than the upper use ratio limit.

If the use ratio of the data transmission path is low, overhead of newly loading the data into the cache memory is originally small. The cache therefore should be used in succession for high efficiency of performance.

As for the cache mode selection method of the present invention in view of the third aspect, the cache mode selection method monitor the use ratio of the data transmission path, and if the use ratio is higher than the upper use ratio limit, the cache mode selection method sets the cache mode to the cache load inhibit mode which is used by the dataset of the inhibited ratio of the datasets using the data transmission path.

As a result, the use ratio of the data transmission path between the cache memory and the secondary storage is lowered, so that the I/O response of the system can be improved. Parts of the datasets, on the other hand, can consecutively use the cache. This can keep a high efficiency of performance.

As for the cache mode selection method of the present invention in view of the fourth aspect, for the random access dataset, the cache mode selection method selects the cache mode selection method in units of dataset in view of the hit ratio and the use ratio. For the sequential access dataset, it can probably select the cache mode in units of data transmission path in view of the use ratio alone.

For the sequential access dataset, the hit ratio becomes mostly 100% as the pre-read is made. It is therefore appropriate to select the cache mode in view of the use ratio only.

The foregoing and other objects, advantages, manner of operation and novel features of the present invention will be understood from the following detailed description when read in connection with the accompanying drawings.

BRIEF DESCRIPTION OF THE DRAWINGS

The present invention may be more fully described by reference to the accompanying drawings in which.

DETAILED DESCRIPTION OF THE PREFERRED EMBODIMENTS

The following describes in detail a first embodiment according to the present invention by reference to the accompanying drawings.

Figure 1:
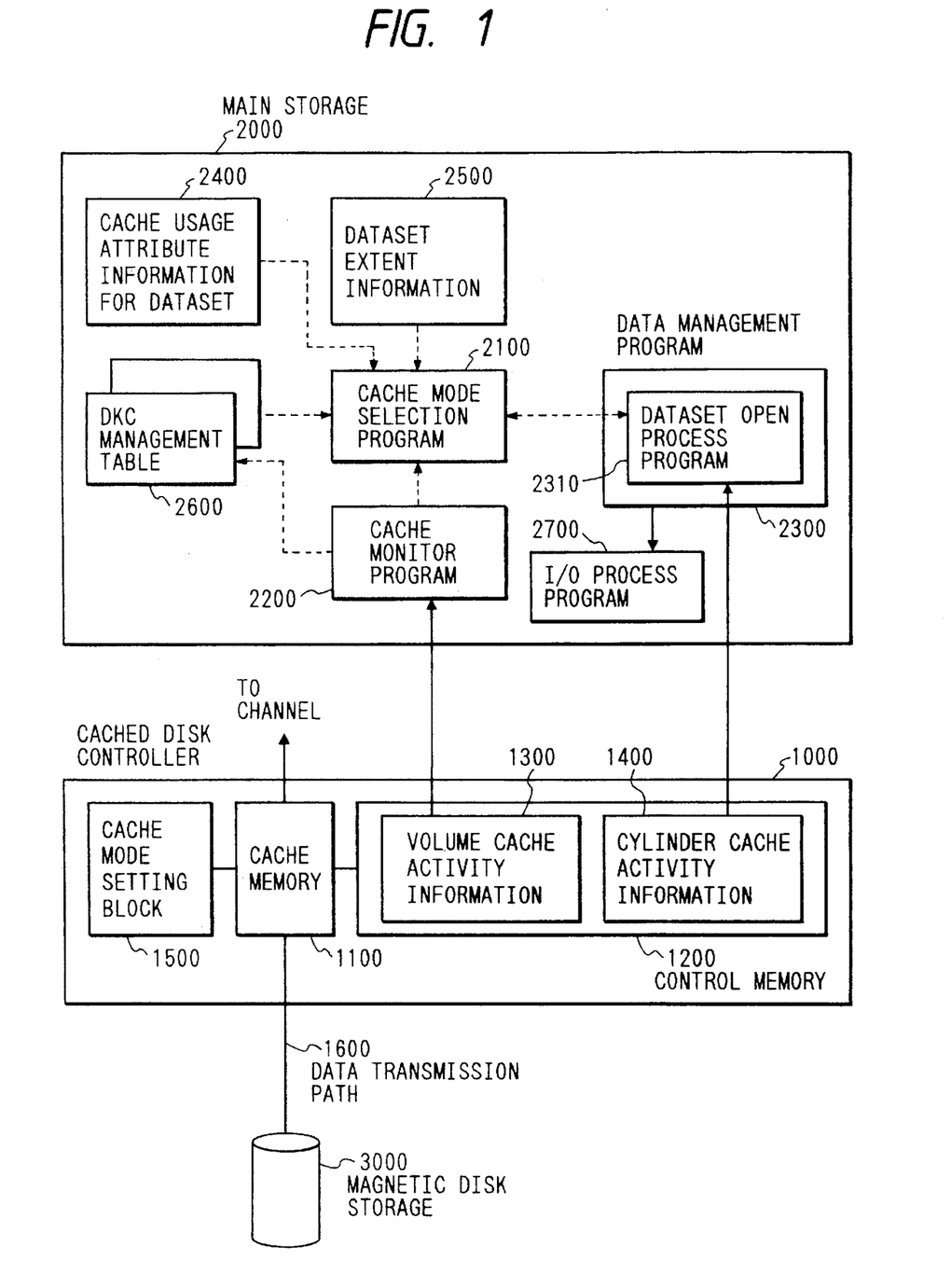
FIG. 1 is a block diagram for a storage system in an embodiment of a cache mode selection method according to the present invention.

FIG. 1 is a block diagram for a storage system in an embodiment of a cache mode selection method according to the present invention.

In the FIG. 1 are indicated a cached disk controller 1000, a main storage 2000, and a magnetic disk storage 3000. There are provide pluralities of cached disk controllers 1000 and magnetic disk storages 3000 although not shown.

Each cached disk controller 1000 has a cache memory 1100, a control memory 1200, and a cache mode setting block 1500 provided therein.

Cache memory 1100 is connected with magnetic disk storage 3000 through a data transmission path 1600.

Control memory 1200 has a volume cache activity information 1300 and a cylinder cache activity information 1400 provided therein.

Figure 2:
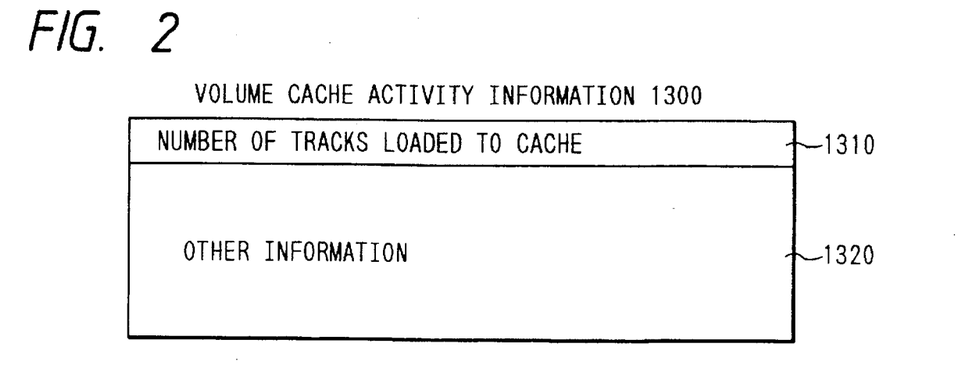
FIG. 2 is a detailed illustrative table for the volume cache activity information shown in FIG. 1.

Volume cache activity information 1300 is made to correspond to magnetic disk storage 3000. It, as shown in FIG. 2, comprises a number 1310 of tracks loaded to cache and other information 1320. Their contents are updated whenever cache access is made.

Figure 3:
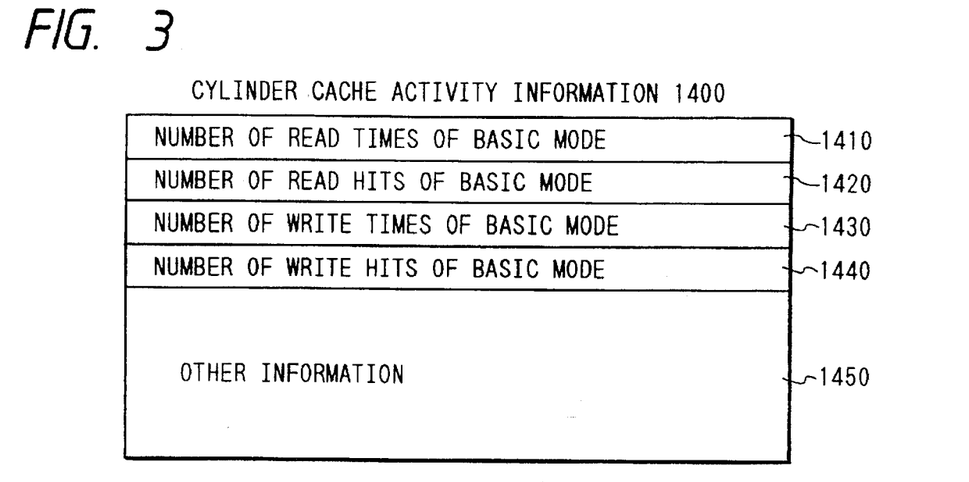
FIG. 3 is a detailed illustrative table for the cylinder cache activity information shown in FIG. 1.

Cylinder cache activity information 1400 is made to correspond to cylinders of magnetic disk storage 3000. It, as shown in FIG. 3, comprises a number 1410 of read times of basic mode, a number 1420 of read hits of basic mode, a number 1430 of write times of basic mode, a number 1440 of write hits of basic mode, and other information 1450. Their contents are updated whenever cache access is made.

Cache mode setting block 1500 is provided to set a cache mode according to direction of channel command word (abbreviated CCW).

Main storage 2000 contains a cache mode selection program 2100, a cache monitor program 2200, a data management program 2300, a cache usage attribute information 2400 for dataset, a dataset extent information 2500, a DKC management table 2600, and an I/O process program 2700.

Cache mode selection program 2100 is provided to select a cache mode of cached disk controller 1000.

Cache monitor program 2200 is provided to monitor volume cache activity information 1300 given in cached disk controller 1000 at regular intervals.

Data management program 2300 is provided to create the channel command word for setting the cache mode.

Figure 4:
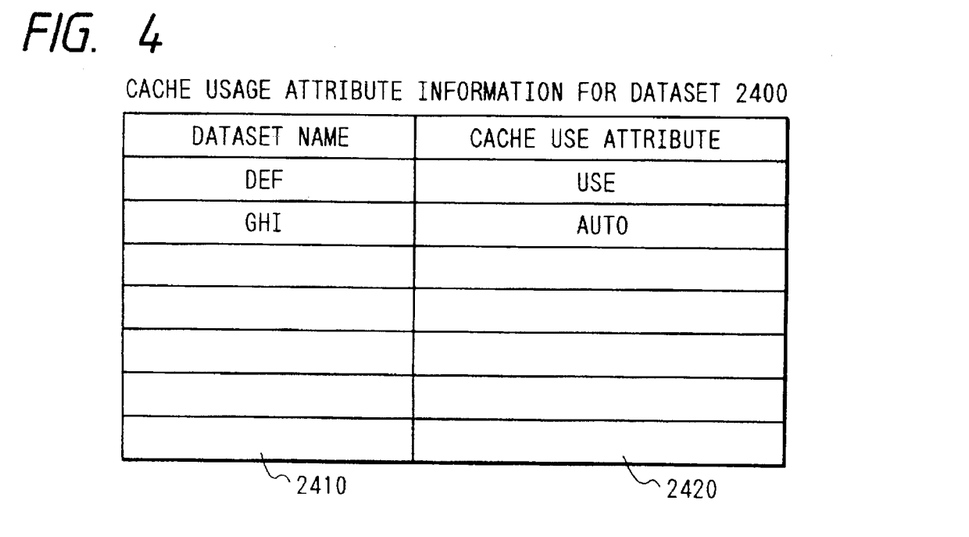
FIG. 4 is a detailed illustrative table for the cache usage attribute information for dataset shown in FIG. 1.

Cache usage attribute information 2400 for dataset comprises a dataset name 2410 and a cache use attribute 2420.

Cache use attribute 2420 provides attribute information of use of the cache for every dataset. It is used to select any of USE, NOTUSE, and AUTO by a user. In USE, the cache is always employed in any of the basic mode or the sequential access mode. In NOTUSE, the cache load inhibit mode. In AUTO, the system of the present invention can automatically select the cache mode according to the cache mode selection method of the present invention.

Figure 5:
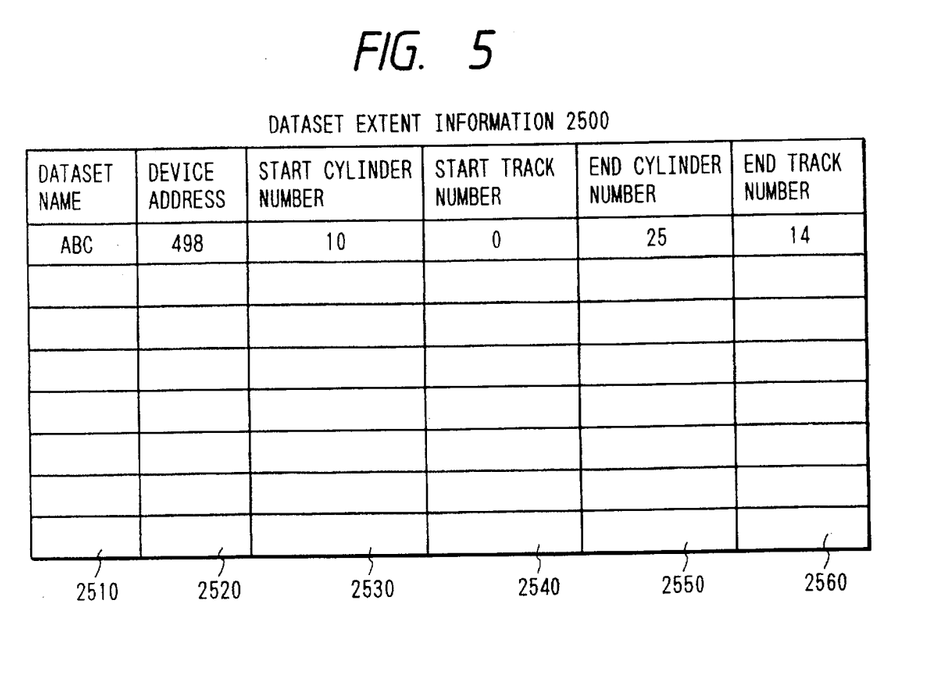
FIG. 5 is a detailed illustrative table for the dataset extent information shown in FIG. 1.

Dataset extent information 2500 provides store position information in magnetic disk storage 3000 for every dataset. It, as shown in FIG. 5, comprises a dataset name 2510, a device address 2520, a start cylinder number 2530, a start track number 2540, an end cylinder number 2550, and an end track number 2560.

Dataset extent information 2500 is created when a dataset is allocated. If the dataset is formed of a plurality of extents, then the dataset extent information 2500 is also made same as the plurality of extents.

Figure 6:
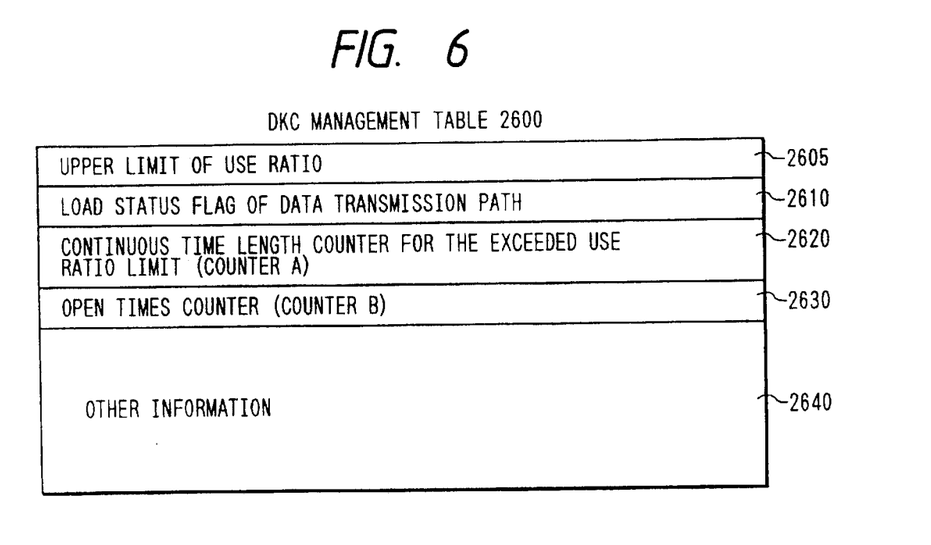
FIG. 6 is a detailed illustrative table for the DKC management table shown in FIG. 1.

DKC management table 2600 has information for managing the state of cached disk controller 1000.

DKC management table 2600 is made to correspond to cached disk controller 1000. It, as shown in FIG. 6, comprises an upper limit 2605 of use ratio, a load status flag 2610 of data transmission path, a continuous time length counter 2620 (counter A) for exceeded use ratio limit, an open times counter 2630 (counter B), and other management information 2640.

Upper limit 2605 of use ratio has an upper limit of use ratio of data transmission path 1600 between cache memory 1100 in corresponding cached disk controller 1000 and magnetic disk storage 3000.

Load status flag 2610 of data transmission path is turned on when the use ratio of data transmission path 1600 between cache memory 1100 in corresponding cached disk controller 1000 and magnetic disk storage 3000 exceeds beyond upper limit 2605 of use ratio. It is turned off when the use ratio goes below the upper limit.

Continuous time length counter 2620 (counter A) for exceeded use ratio limit is a counter indicating a continuous period for which the use ratio of data transmission path 1600 between cache memory 1100 in corresponding cached disk controller 1000 and magnetic disk storage 3000 exceeds beyond upper limit 2605 of use ratio continuously. Continuous time length counter 2620 (counter A) for exceeded use ratio limit will be referred to as the "counter A" in FIG. 7 and below.

Open times counter 2630 (counter B) is a counter for counting number of times that the sequential access dataset stored in a volume connected to corresponding cached disk controller 1000 has been made open for a monitoring period of cache monitor program 2200. Open times counter 2630 (counter B) will be referred to as the "counter B" in FIG. 7 and below.

I/O process program 2700 executes input/output process.

Figure 7:
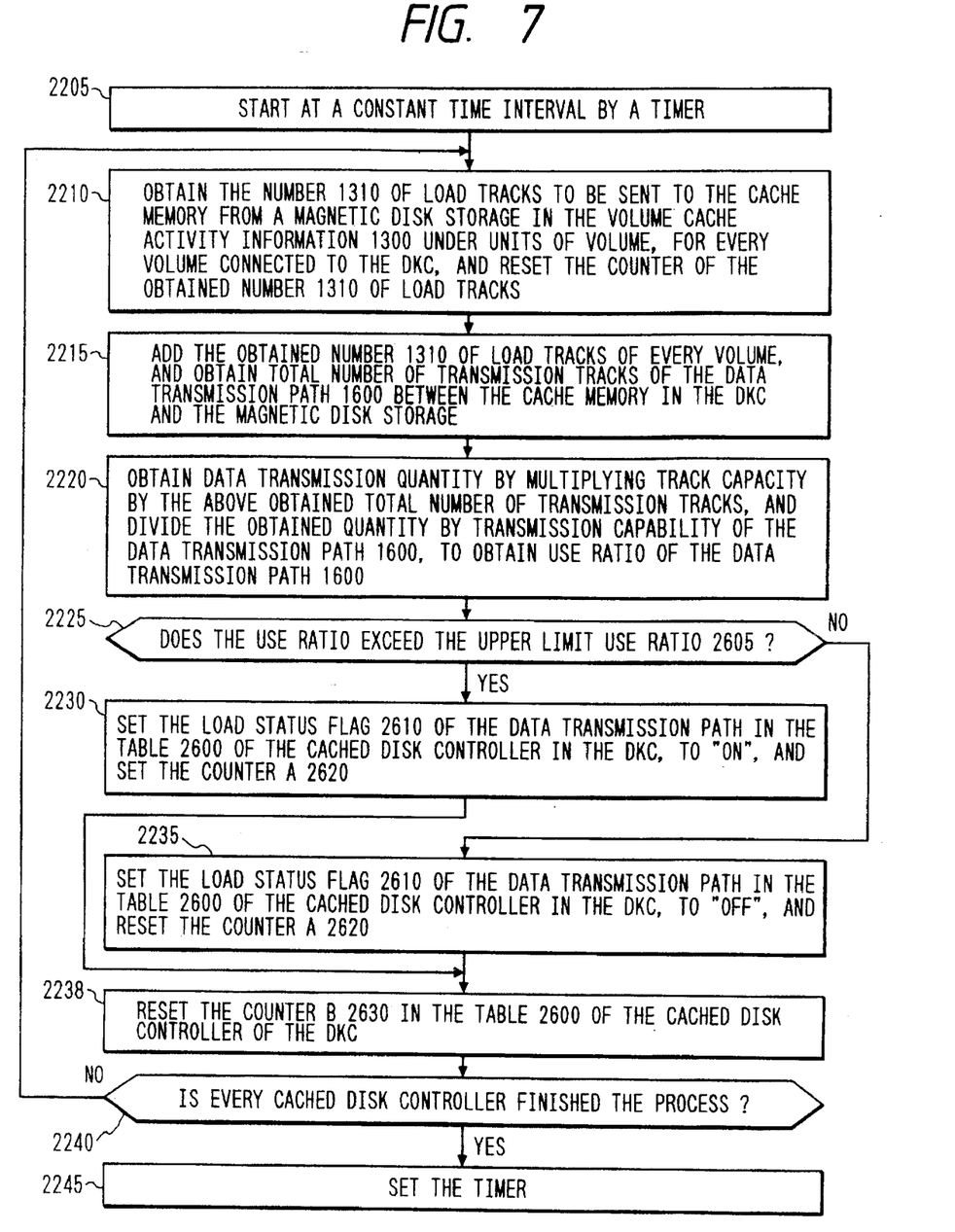
FIG. 7 is a flow chart for process of the cache monitor program shown in FIG. 1.

FIG. 7 is a flow chart for process of cache monitor program 2200.

Step 2205: Cache monitor program 2200 starts the process at regular intervals by a timer.

Step 2210: Cache monitor program 2200 obtains number 1310 of tracks loaded to cache in volume cache activity information 1300 for every volume connected to cached disk controller 1000. After the acquisition, it resets number 1310 of loaded tracks to the cache to 0.

Step 2215: Cache monitor program 2200 adds up all obtained number 1310 of loaded tracks of every volume. It then obtains total number of transmission tracks of data transmission path 1600 between cache memory 1100 in corresponding cached disk controller 1000 and magnetic disk storage 3000.

Step 2220: Cache monitor program 2200 obtains quantity of data transmission by multiplying the above obtained total number of transmission tracks by track capacity. It then divides the obtained quantity by transmission capability of data transmission path 1600 to obtain the use ratio of data transmission path 1600.

Step 2225: Cache monitor program 2200 judges whether or not the use ratio exceeds upper limit 2605 of use ratio.

Step 2230: If the use ratio exceeds beyond upper limit 2605, then cache monitor program 2200 turns on load status flag 2610 of the transmission path in DKC management table 2600 for the cached disk controller 1000. It also counts up continuous time length counter 2620 (counter A) for exceeded use ratio limit by 1.

Step 2235: If the use ratio does not exceed over upper limit 2605, then cache monitor program 2200 turns off load status flag 2610 of the transmission path in DKC management table 2600 for the cached disk controller 1000. It also resets continuous time length counter 2620 (counter A) for exceeded use ratio limit to 0.

Step 2238: In turn, cache monitor program 2200 resets to 0 open times counter 2630 (counter B) in DKC management table 2600 for the cached disk controller 1000.

Step 2240: Cache monitor program 2200 repeats the processes at steps 2210 to 2238 of all other cached disk controllers 1000.

Step 2245: Finally, cache monitor program 2200 sets the timer for the succeeding monitoring process.

With the processes of cache monitor program 2200, the use ratio of data transmission path 1600 between cache memory 1100 and magnetic disk storage 3000 can be monitored at the regular intervals. If the use ratio of data transmission path 1600 exceeds beyond upper limit 2605, the status can be reflected to load status flag 2610 of data transmission path in DKC management table 2600. With continuous time length counter 2620 (counter A) for exceeded use ratio limit in DKC management table 2600, it can be made to count the period of the continuous state that the use ratio of data transmission path 1600 is exceeding beyond upper limit 2605 of use ratio.

Figure 8:
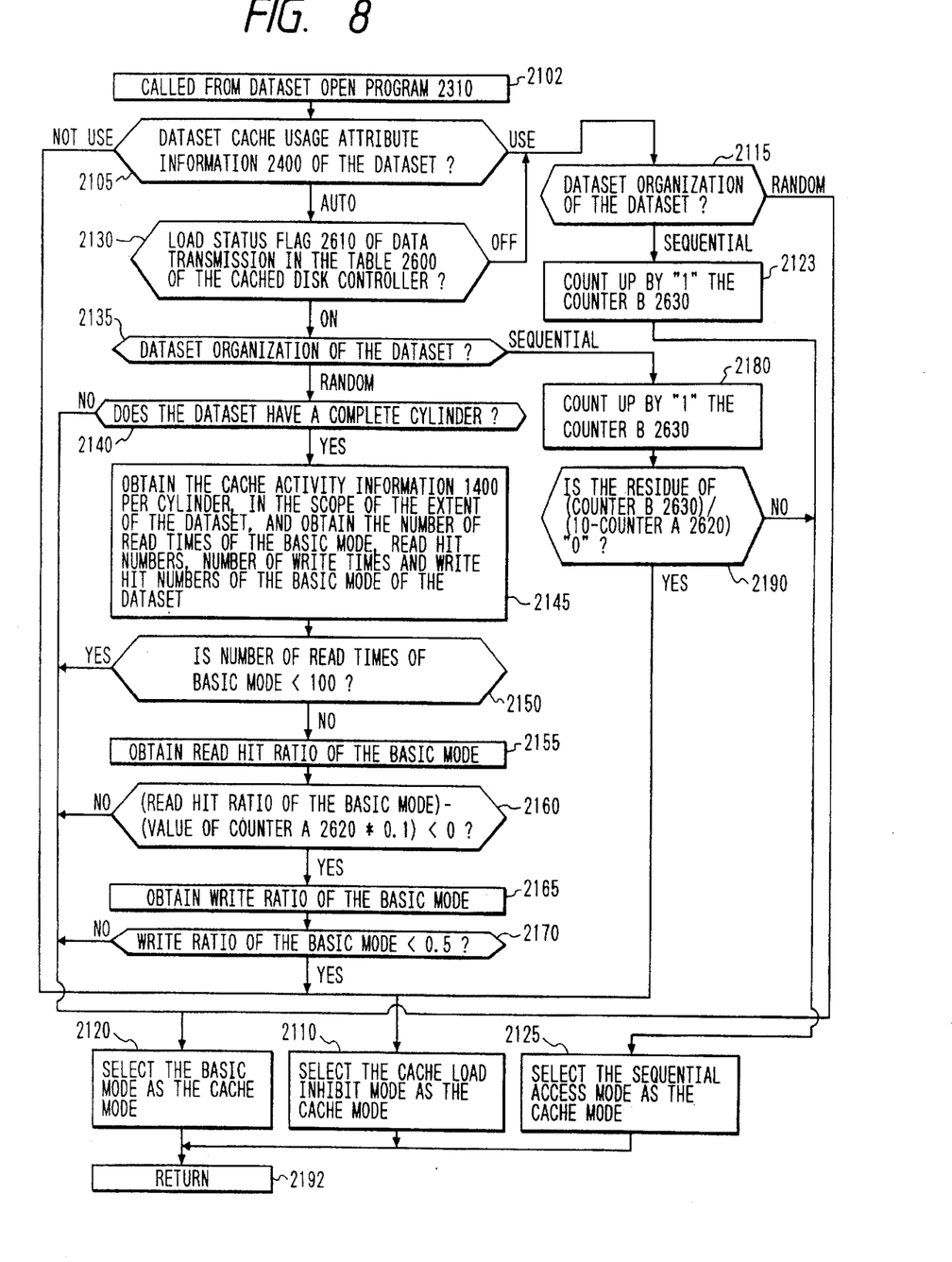
FIG. 8 is a flow chart for process of the cache mode selection program in FIG. 1.

FIG. 8 is a flow chart for process of cache mode selection program 2100.

Step 2102: The process is called by a dataset open process program 2310 in data management program 2300 to start.

Step 2105: First, cache mode selection program 2100 checks cache usage attribute information 2400 for dataset of the dataset to be made open.

Step 2110: If the cache usage attribute is NOTUSE, cache mode selection program 2100 selects the cache load inhibit mode.

Step 2115: If the cache usage attribute is USE, cache mode selection program 2100 checks whether the dataset is random access dataset or sequential access dataset.

Step 2120: If it is random access dataset, cache mode selection program 2100 selects the basic mode.

Step 2123: If it is sequential access dataset, cache mode selection program 2100 checks magnetic disk storage 3000 to store the dataset by using dataset extent information 2500 for the dataset. It then counts up by 1 open times counter 2630 (counter B) of DKC management table 2600 for cached disk controller 1000 connected with magnetic disk storage 3000.

Step 2125: Cache mode selection program 2100 then selects the sequential access mode.

Step 2130: If the cache usage attribute is AUTO, cache mode selection program 2100 checks magnetic disk storage 3000 to store the dataset by using dataset extent information 2500 for the dataset. It also checks load status flag 2610 of data transmission path of DKC management table 2600 for cached disk controller 1000 connected with magnetic disk storage 3000.

If load status flag 2610 of data transmission path is off, then cache mode selection program 2100 goes to step 2115. Step 2115 selects the basic mode or the sequential access mode depending on organization of the dataset.

Step 2135: If load status flag 2610 of data transmission path is on, cache mode selection program 2100 checks whether the dataset is random access dataset or sequential access dataset.

Step 2140: If it is random access dataset, cache mode selection program 2100 checks whether the dataset is a dataset having complete cylinder or not by using dataset extent information 2500 for the dataset. The term "dataset having complete cylinder" as used here denotes a dataset having one or more complete cylinders. The "complete cylinder" denotes a cylinder all the parts of which are allocated to one dataset.

If the dataset is not the one having complete cylinder, cache mode selection program 2100 goes to step 2120 to select the basic mode at all times as it is hard to know of the hit ratio of the dataset.

Step 2145: If the dataset is the one having complete cylinder, cache mode selection program 2100 checks the complete cylinder by using dataset extent information 2500 for the dataset. It obtains cylinder cache activity information 1400 corresponding to the complete cylinder. It then adds up number 1410 of read times of basic mode, number 1420 of read hits of basic mode, number 1430 of write times of basic mode, and number 1440 of write hits of basic mode for all the complete cylinders. This obtains number of read times of the basic mode, number of read hit times, number of write times of the basic mode, and number of write hit times of the basic mode for the dataset.

Step 2150: Cache mode selection program 2100 checks whether the number of read times of the basic mode for the dataset is less than 100 times.

If the number of read times of the basic mode for the dataset is less than 100 times, cache mode selection program 2100 goes to step 2120 to always select the basic mode as the hit ratio of the dataset is too low in the reliability.

Step 2155: If the number of read times of the basic mode for the dataset is not less than 100 times, cache mode selection program 2100 divides the number of read hit times of the basic mode for the dataset by the number of read times of the basic mode to obtain the read hit ratio of the basic mode for the dataset.

Step 2160: Cache mode selection program 2100 compares the read hit ratio of the basic mode for the dataset with a lower hit ratio limit. The term "lower hit ratio limit" as used herein denotes a value of continuous time length counter 2620 (counter A) for exceeded use ratio limit in DKC management table 2600 by 0.1 with respect to cached disk controller 1000 connected with magnetic disk storage 3000 to have the dataset.

If the read hit ratio of the basic mode for the dataset is greater than or equal to the lower hit ratio limit, cache mode selection program 2100 goes to step 2120 to select the basic mode.

Step 2165: If the read hit ratio of the basic mode for the dataset is smaller than the lower hit ratio limit, cache mode selection program 2100 obtains the write ratio of the basic mode for the dataset in terms of the number of read times of the basic mode and the number of write times of the basic mode for the dataset.

If the write ratio of the basic mode for the dataset is equal to or greater than 0.5, cache mode selection program 2100 goes to step 2120 to select the basic mode as use of the cache is higher in the efficiency.

On the other hand, if the write ratio of the basic mode for the dataset is smaller than 0.5, cache mode selection program 2100 goes to step 2110 to select the cache load inhibit mode.

Step 2180: If at step 2135, the dataset is sequential access dataset, cache mode selection program 2100 counts up by one (1) open times counter 2630 (counter B) of DKC management table 2600 for cached disk controller 1000 connected with magnetic disk storage 3000 to have the dataset.

Step 2190: Cache mode selection program 2100 then divides the value indicated in the open times counter 2630 (counter B) by the value of (10-value indicated in the continuous time length counter 2620 (counter A)), and checks whether the residue is 0 or not.

If the residue is 0, cache mode selection program 2100 goes to step 2110 to select the cache load inhibit If the quotient is not 0, cache mode selection program 2100 goes to step 2125 to select the sequential access mode.

As a result of the process described above, the cache load inhibit mode is selected once in (10-value indicated in the continuous time length counter 2620 (counter A)) times.

Step 2192: Finally, cache mode selection program 2100 returns control to dataset open process program 2310.

Dataset open process program 2310 creates a channel program using the channel command word that specified the cache mode selected by cache mode selection program 2100.

I/O process program 2700 executes the channel program mentioned above.

Then, cache mode setting block 1500 in cached disk controller 1000 operates to set the cache mode selected by cache mode selection program 2100.

As described so far, it can prevent the I/O response from decreasing by turning the cache mode of parts of the dataset to the cache load inhibit mode.

For the random access dataset, the lower hit ratio limit can be varied depending on the continuous time length for the exceeded use ratio limit. This can reduce the dataset using the cache to a great extent to prevent the system performance from decreasing.

Also, for the sequential access dataset, the inhibit ratio can be varied depending on the continuous time length in which use ratio limit is exceeded. This can reduce the dataset using the cache to a great extent to prevent the system performance from decreasing.

In the embodiment described above, cache mode selection program 2100 is started when the dataset is made open. Alternatively, it can be started either when access is made to data of the dataset, when the extent end process for a sequential access dataset of multi-extent type is made, or when the volume of a multi-volume dataset is changed.

Another embodiment of the present invention includes an example where the lower hit ratio limit is fixed. The inventors conducted an access simulation of a few hour long for twelve disk units of 1.5 Gbytes each under an online environment with a mainframe computer. As a result, it provided an increase of 18% of the mean read hit ratio of the random access dataset which did not enter the cache load inhibit mode, with the lower hit ratio limit fixed to 20%.

With the cache mode selection method according to the present invention, the I/O response of the system can be improved as use of the data transmission path between the cache memory and the secondary storage can be decreased. In addition, the read hit ratio of the dataset using the cache can be increased.

What is claimed is:

1. A cache mode selection method in a computer system having a storage device, a cache memory, a storage device controller and a data transmission path between said storage device and said controller, comprising:

a use rate monitoring step of obtaining a rate of use of said data transmission path for an access to a dataset stored in said storage device;

a hit ratio monitoring step for obtaining a cache access hit ratio of a dataset, when an access is made, for each access to said dataset which is stored in said storage device;

a cache load inhibit step of setting a cache load inhibit mode for said dataset, when said rate of use obtained through said use rate monitoring step is higher than a second limit, and said cache access hit ratio obtained through said hit ratio monitoring step is lower than a first limit;

a continuous time length monitoring step of obtaining a continuous time length in which said use rate is continuously higher than said second limit; and a lower hit ratio setting step of making said first limit high in proportion to said continuous time length obtained through said continuous time length monitoring step.

* * * * *